United States Patent
Lansinger

(10) Patent No.: US 6,502,887 B1
(45) Date of Patent: Jan. 7, 2003

(54) ARRANGEMENT FOR MOUNTING A RESTRAINT BELT MOUNTED VEHICLE SEAT TO A VEHICLE FLOOR

(75) Inventor: Jere R Lansinger, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/896,708

(22) Filed: Jun. 29, 2001

(51) Int. Cl.$^7$ ................................................ B60N 2/02
(52) U.S. Cl. ................................ 296/65.13; 296/65.14; 296/68.1
(58) Field of Search ........................ 296/65.13, 65.14, 296/68.1, 216.1; 297/216.17, 216.19, 216.16, 216.1, 473, 344.1, 362.11, 483, 452.18, 362.14; 248/429, 430; 280/801.1, 808, 804

(56) References Cited

U.S. PATENT DOCUMENTS

| | | | | |
|---|---|---|---|---|
| 2,715,433 A | * | 8/1955 | Dolgorukov | 296/65.14 |
| 3,845,982 A | * | 11/1974 | Pickles | 296/68.1 |
| 3,853,298 A | * | 12/1974 | Libkie et al. | 396/68.1 |
| 4,248,480 A | * | 2/1981 | Koucky et al. | 296/65.13 |
| 4,676,555 A | * | 6/1987 | Tokugawa | 297/216.1 |
| 4,865,377 A | * | 9/1989 | Musser et al. | 296/68.1 |
| 4,948,189 A | * | 8/1990 | Terada et al. | 296/65.13 |
| 4,978,097 A | | 12/1990 | Froutzis | |
| 5,011,209 A | * | 4/1991 | Takarabe et al. | 296/65.14 |
| 5,106,144 A | * | 4/1992 | Hayakawa et al. | 296/65.14 |
| 5,314,206 A | * | 5/1994 | Vollmer | 296/68.1 |
| 5,322,348 A | * | 6/1994 | Johnson | 297/473 |
| 5,362,132 A | * | 11/1994 | Griswold et al. | 297/344.1 |
| 5,593,209 A | * | 1/1997 | Bauer et al. | 297/344.13 |
| 5,782,533 A | * | 7/1998 | Fischer et al. | 248/421 |
| 5,803,491 A | | 9/1998 | Barnes et al. | |
| 5,813,726 A | | 9/1998 | Husted | |
| 5,941,600 A | | 8/1999 | Mar et al. | |
| 5,961,089 A | | 10/1999 | Soisnard | |
| 5,967,604 A | * | 10/1999 | Yoshida et al. | 296/68.1 |
| 6,010,195 A | * | 1/2000 | Masters et al. | 297/284.11 |
| 6,045,124 A | | 4/2000 | Walton | |
| 6,053,529 A | | 4/2000 | Frusti et al. | |
| 6,073,893 A | * | 6/2000 | Koga | 248/424 |
| 6,092,853 A | * | 7/2000 | Hubbard | 296/68.1 |
| 6,142,564 A | * | 11/2000 | Pajela et al. | 297/216.18 |
| 6,161,891 A | * | 12/2000 | Blakesley | 296/68.1 |
| 6,183,032 B1 | * | 2/2001 | Champ | 296/65.03 |
| 6,323,444 B1 | * | 11/2001 | Aoki | 280/735 |
| 6,334,643 B1 | * | 1/2002 | Lindblad et al. | 296/68.1 |
| 6,407,347 B1 | * | 6/2002 | Blakesley | 280/735 |
| 2001/0033074 A1 | * | 10/2001 | Aoki et al. | 297/216.1 |
| 2002/0027368 A1 | * | 3/2002 | Volz et al. | 296/66 |

FOREIGN PATENT DOCUMENTS

| | | | |
|---|---|---|---|
| DE | 3405097 | * | 8/1985 |
| JP | 5 8670 | * | 1/1993 |

* cited by examiner

Primary Examiner—Kiran Patel
(74) Attorney, Agent, or Firm—Mark P. Calcaterra

(57) ABSTRACT

An arrangement for mounting a restraint belt mounted vehicle seat to a floor of an automotive vehicle is provided. The arrangement includes a floor rail supporting the vehicle seat, a load cell providing a supporting platform for the floor rail above the vehicle floor, a force transmittal member connected to the floor rail, a headed fastener connected to the vehicle floor, and a capture member connected to the vehicle floor by the fastener, the capture member in normal operational conditions having a clearance with the force transmittal member. In a predefined vehicle crash situation the force transmittal member is moved to an interference with the capture member retaining the floor rail to the vehicle floor.

9 Claims, 2 Drawing Sheets

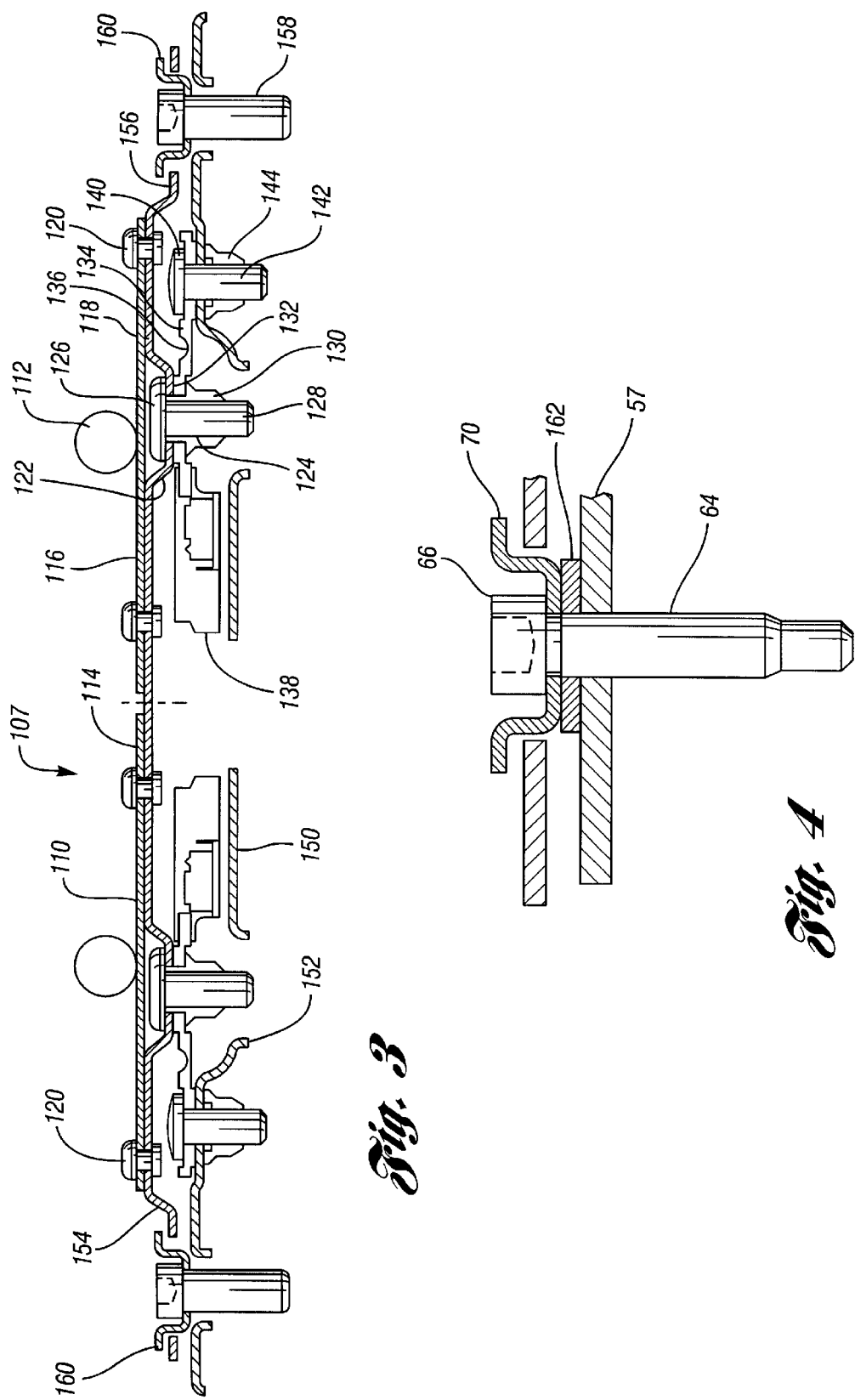

ARRANGEMENT FOR MOUNTING A RESTRAINT BELT MOUNTED VEHICLE SEAT TO A VEHICLE FLOOR

FIELD OF THE INVENTION

The present invention relates to an arrangement for mounting a restraint belt mounted vehicle seat to a vehicle floor and more particularly, to an arrangement for mounting a restraint belt mounted vehicle seat in an automotive vehicle that has an air bag system with multiple modes of inflation.

BACKGROUND OF THE INVENTION

A typical automotive vehicle seat has a seat bun or cushion that supports the buttocks and upper thigh region of a seated occupant. Adjustably and pivotally connected to the seat cushion is a seat back. The seat back supports the back region of a seated occupant. The seat cushion is connected to a seat riser. To allow the seat to have fore and aft adjustment, a seat adjuster is provided. The seat adjuster includes a seat channel, also referred to as a seat rail. The seat rail is slidably mounted on a lower rail, often referred to as a floor rail. The floor rail is typically connected to the floor pan of the vehicle. Typically, the seat rail is interlocked along its length with the floor rail to prevent vertical separation. To ease the sliding movement between the seat rail and the floor rail, ball bearings or rollers spaced between the seat rail and floor rail are provided. The seat rail has a spring-biased locking mechanism that engages with a connected or integral rack provided on the floor rail to lock the relative fore and aft position between the seat rail and floor rail. Typically, the vehicle seat will have two parallel sets of floor rails and seat rails. A master floor rail and seat rail combination will have a master latch which manipulates a slave latch unit on a parallel spaced slave floor and seat rail assembly.

In the most recent quarter-century, to facilitate vehicle safety, seatbelts have been added to vehicles. As a further enhancement of vehicle safety, three-point seatbelts have been provided which include shoulder restraints. Most front seatbelts have one end anchored to a B-pillar of the vehicle. The belt extends downward across the torso of a seated occupant through a loop. From the loop, the belt is routed across the seat occupant's lap and is then anchored to the vehicle floor. In a frontal crash, the load placed on the belt by a front seat occupant is mainly taken up by the B-pillar and/or the floor pan which the belt is anchored to.

In the most recent decade, a new type of anchoring system has been developed, commonly referred to as a belt-to-seat anchor restraint system. In the belt-to-seat anchor restraint system, one end of the belt is anchored to the B-pillar or to an upper region of the vehicle seat. The opposite extreme end of the belt is anchored to the upper portion of the seat riser which is fixably connected to the seat rail. The inner connection between the seat rail and the floor rail is strengthened to withstand the forces applied during a frontal crash situation.

Many vehicles on the road today have airbags installed in steering wheels, dashboards, and more recently, doors. These airbags are designed to protect a vehicle occupant against both front and side impact collisions by rapidly inflating the airbag to absorb much of the collision energy that would otherwise be transferred to the occupant.

Such conventional airbags are inflated based on a single threshold test: if a predetermined vehicle deceleration occurs in a collision, airbag inflation is triggered. Thereafter, airbag deployment occurs at a predetermined inflation rate. Both the triggering threshold and the inflation rate are typically not modified based on the type of vehicle collision, or the many different occupant variables, such as occupant weight, occupant position at the moment of impact, etc.

There has been a desire to modify air bag deployment based upon occupant weight and position. Typically, the larger the occupant, the greater the desired inflative force. For smaller occupants, a lowered inflative force response is desired.

There are two major approaches to determine occupant weight on a vehicle seat. One approach is to have a pressure sensitive pad or bladder mounted somewhere within the seat cushion. Another approach is to place weight sensors between the floor pan and floor rail to sense the weight distribution on the vehicle seat and at a predetermined time sequence, inform the seatbelt inflater controller of the weight placed upon the vehicle seat. When using the weight sensor system, a new problem has occurred. The weight sensor typically adds a fixed link between the vehicle floor pan and the floor rail. Although this link is typically very strong in compression, there are limitations of this link in tension. Some vehicle occupant weight sensor systems rely upon a cantilevered support arrangement between the floor rail and floor pan of the vehicle. Cantilevered support arrangement weight sensors are typically very weak in tension.

It is desirable to provide a seat mounting system which allows for the utilization of a weight sensor element spaced between the floor rail of the vehicle seat and the floor pan of the vehicle, while at the same time allowing the vehicle to utilize a belt restraint seat anchoring system that anchors the restraint belt to the seat.

SUMMARY OF THE INVENTION

In a preferred embodiment, the present invention brings forth an arrangement for mounting a restraint belt mounted vehicle seat to a floor of an automotive vehicle. The arrangement includes a floor rail that supports the vehicle seat typically by a fore and aft seat adjuster that includes an interlocking seat rail. A load cell provides a supporting platform for the floor rail above the vehicle floor. Connected to the floor rail is a force transmittal member.

In a preferred embodiment of the present invention, the force transmittal member has an aperture. Inserted through the aperture is a headed fastener that is connected to the vehicle floor. Additionally, a lower riser is provided which is connected to the floor rail via the load cell. The lower riser is connected to and held in position on the vehicle floor by the aforementioned fastener. The head of the fastener restrains a capture member and connects the capture member to the vehicle floor. In a preferred embodiment the capture member has a generally U-shaped cross-section with extending flanges. The capture member is positioned adjacent the aperture in the force transmittal member.

During normal operation, the compressive load of the vehicle seat is transmitted from the floor rail via the load cell to the lower riser and then to the vehicle floor. Upon a frontal crash situation, the floor rail will displace in an upward vertical motion and cause the force transmittal member to come into an interference situation with the capture member and thereby be retained to the vehicle floor. The floor rail will not be dependent upon the tensile strength of the load cell to return the vehicle seat to its position. The vehicle seat designer is now free to provide a load cell arrangement which can give sensory data to an air bag deployment system, while at the same time allow the vehicle seat to have a belt-to-seat mounting arrangement.

It is a feature of the present invention to provide an arrangement for mounting a restraint belt mounted vehicle seat to a floor of an automotive vehicle.

It is also a feature of the present invention to provide a method of retaining a vehicle seat to the floor of an automotive vehicle in a frontal crash situation wherein the vehicle seat utilizes load cells to sense the weight distribution upon the vehicle seat to inform a dual mode airbag inflation system.

Other features of the invention will become more apparent to those skilled in the art upon a reading of the following detailed description and upon reference to the drawings.

BRIEF DESCRIPTION OF THE DRAWINGS

FIG. 3 is a side elevational view of an alternative and preferred embodiment of a seat mounting arrangement of the present invention.

FIG. 4 is a view similar to that of FIG. 3, illustrating an alternative preferred embodiment fastener arrangement.

DETAILED DESCRIPTION OF THE INVENTION

Figure 1:
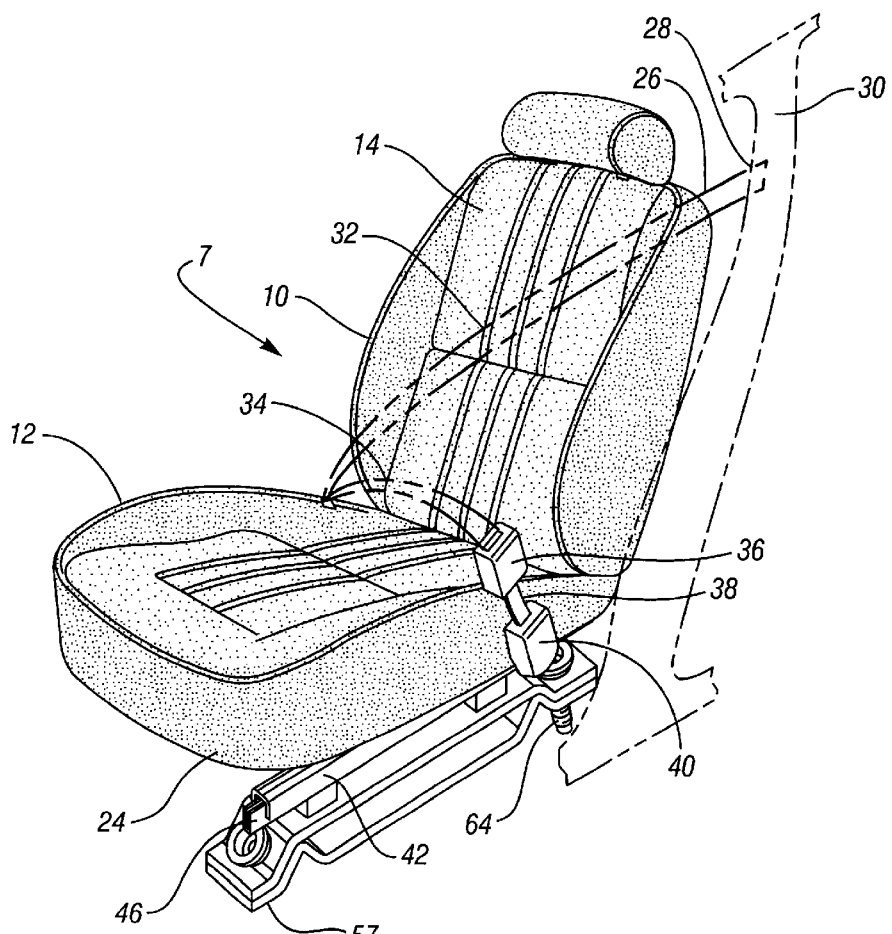
FIG. 1 is a perspective view of an automotive vehicle seat that utilizes the seat mounting arrangement according to the present invention.
Figure 2:
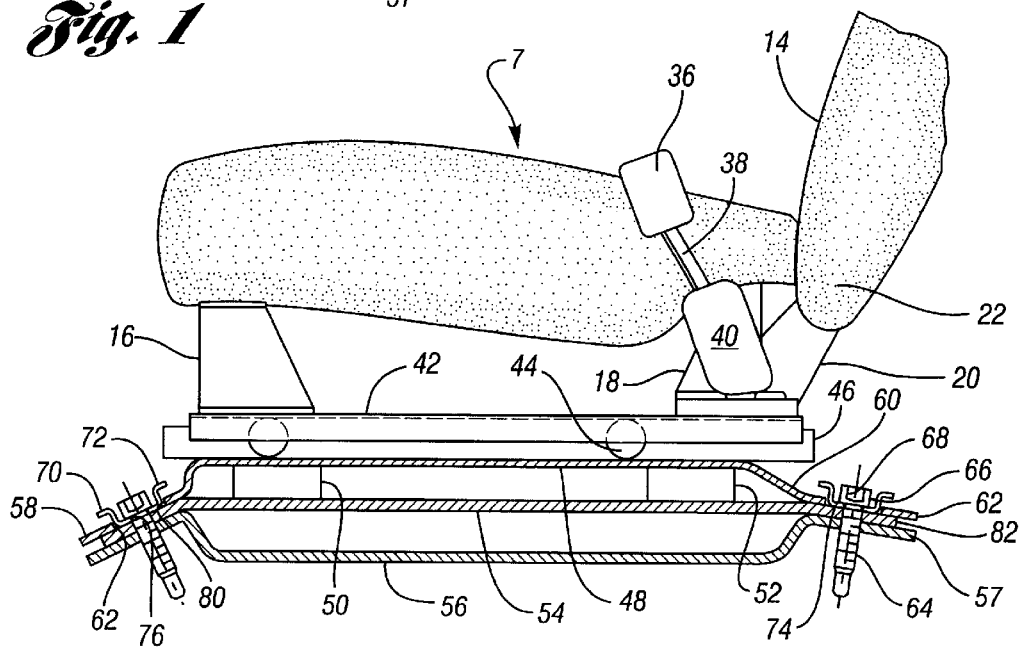
FIG. 2 is a side elevational view of the vehicle seat mounting arrangement shown in FIG. 1.

Referring to FIGS. 1–2, an arrangement 7 for mounting a restraint belt mounted vehicle seat to a floor of an automotive vehicle is provided. The automotive vehicle has positioned therein a passenger seat 10. The seat 10 includes a seat cushion 12. Pivotally and operationally adjustably connected with respect to the seat cushion 12 is a seat back 14. The seat cushion 12 is supported on two parallel spaced (only one shown) front seat risers 16. A rear end of the seat cushion 12 is supported on a rear seat riser 18. The rear seat riser 18 has a rear branch 20. The rear branch 20 provides for the pivotal connection about axis 22 of the seat back 14. The seat risers 16, 18 usually are hidden by a membrane cover or skirt 24 (FIG. 1); however, for purposes of illustration they are exposed in FIG. 2.

The vehicle seat 10 also has a belt restraint system which includes a restraint belt 26. The restraint belt 26 is commonly called a 3-point restraint system. An upper end 28 of the restraint belt is connected to a retractor (not shown) which is fixably connected to a B-pillar 30 of the vehicle. If the vehicle seat 10 is utilized in the rear seat rather than as a front seat, the attachment of the retractor will be with a C-pillar rather than a B-pillar. In other embodiments (not shown) the retractor for the restraint belt 26 may be physically connected to an upper end of the seat back 14.

The restraint belt 26 has an upper torso portion 32 which crosses over the chest and torso of a seated occupant. In some embodiments of restraint belt systems (not shown) the upper torso portion of the belt 32 may be eyed through a loop connected to the outboard upper end of the seat back 14. A lower end of the upper torso portion 32 of the restraint belt is eyed through a loop (not shown) which is fixably connected to the vehicle seat 10. From the loop, the restraint belt has a lower lap portion 34 which restrains a seated occupant in his or her pelvic area. The lap belt 34 has on its extreme end a loop (not shown) which snaps into a seat belt buckle 36. The seat belt buckle 36 is fixably connected to a tension member 38. The tension member 38 is pivotally connected to the rear seat riser 18. The pivotal connection of the tension member 38 with the rear seat riser 18 is covered by a polymeric boot 40.

The seat risers 16, 18 are fixably connected to a seat rail 42. The seat rail 42 is sometimes referred to as a seat channel, top rail or top channel. The seat rail 42 is translationally mounted on rollers 44. Additionally, the seat rail 42 has a latch adjustable fore and aft adjustment with a supporting floor rail 46. The seat rail 42 has flanges (not shown) which have a vertical interlocking relationship with flanges (not shown) connected to the floor rail 46. Accordingly, the seat rail 42 cannot be vertically displaced from the floor rail 46 without the causation of plastic deformation of both the seat rail 42 and floor rail 46. A more detailed explanation of the interlocking relationship can be found by a review of U.S. Pat. Nos. 5,482,243; 4,832,409 and 4,787,756.

The floor rails 46 (only the outboard floor rail 46 being shown in FIG. 1) which are parallel spaced from one another support the vehicle seat 10 and the weight of the seat occupant. The floor rails 46 are fixably connected to a support member 48. Underneath the support member 48 is a front load cell 50 and a rear load cell 52. The load cells 50, 52 provide a supporting platform for the floor rail 46 above the floor 57. The load cells 50, 52 will be electrically connected with a controller (not shown) of an inflatable air bag restraint system.

The load cells will inform the air bag controller not only of the respective weight placed upon the load cells 50, 52 but will also give the air bag controller a concept of weight distribution. The information from the load cells can be used to determine if a large or small occupant is occupying the seat 10. If a low amount of weight is sensed by the load cells 50, 52 the controller may be programmed to assume that an occupant of smaller stature is positioned within the seat and accordingly lower the inflation force of the air bag. In contrast, if the load cells 50, 52 record a higher weight for the vehicle seat occupant, the load cells 50, 52 will signal the controller for maximum inflation. The load cells 50, 52 are seated on a floor board depression bridge 54. The bridge 54 spans a reinforcement depression 56 provided in the vehicle floor 57.

The support member 48 is fixably connected to the floor rail 46 by fasteners (not shown). The support member 48 along its forward end has integrally connected thereto a force transmittal member 58. At a rear end the support member 48 has an integral force transmittal member 60. The force transmittal members 58, 60 each have an enlarged aperture 62.

Inserted within the aperture 62 is a fastener 64. The fastener 64 has a head 66. The head 66 has a depression 68 for receipt of a drive socket (not shown). The fasteners 64 connect capture members 70 to the vehicle floor 57. The capture members are generally U-shaped in their cross-section with a generally radially outward extending flange 72. The capture members 70 have a base 74. The base 74 has an aperture 76 which the fastener 64 is inserted through. The base 74 is engaged by the head 66 of the fastener to connect the capture member 70 with the vehicle floor 57.

The force transmittal members 58, 60 each have an aperture 80 which encircles a side wall 82 of the capture members and has a slight clearance therewith. Accordingly the apertures 80 are positioned under and adjacent the flanges 72 of the capture members.

In normal operating conditions, the force transmittal members 58, 60 have a clearance with the capture members 70. In a predefined vehicle crash situation (typically a frontal crash) a vehicle seat occupant will load the restraint belt 26 which will cause an upward vertical force to be placed upon the rear seat riser 18. The upward force on the rear seat riser 18 will cause the seat rail 42 to pull up on the floor rail 46. The interlocking arrangement between the seat rail 42 and the floor rail 46 (not shown) will cause the floor rail 46 to pull up on the support member 48. The resultant upward force of the floor rail 46 in many situations will cause it to either separate from the load cells 50, 52 or cause the load cells 50, 52 to separate from the depression bridge 54. The force transmittal members 58 and especially 60 will be moved to an interference condition with the flanges 72 of the capture members 70. The floor rails 46 will be retained to the floor 57 and separation of the vehicle seat 10 from the vehicle floor 57 will be avoided in compliance with the seat retention requirements of the vehicle.

FIG. 3 illustrates an alternative preferred embodiment 107 for mounting a restraint belt mounted vehicle seat to a floor of an automotive vehicle. The mounting arrangement 107 has a multi-piece floor rail 110. The floor rail 110 supports a set of rollers 112 which support a seat rail (not shown). The floor rail 110 has a front top plate 114. The floor rail 110 also has a rear top plate 116. The top plates 114, 116 are joined to a bottom plate 118 by a series of rivets 120. The bottom plate 118 has an expanded mound 122 which has an aperture 124. Captured within the mound 122 is a head 126 of a fastener 128. The fastener 128 is positioned within an expanding sleeve 130.

Between the sleeve 130 and a flat 132 of the mound 122 is a cantilevered strain gauge portion 134 of a load cell. The strain gauge portion 134 has a strain notch 136. Opposite the strain gauge portion 134 is a cantilevered sensor box 138 which houses the appropriate electronics utilized by the load cell.

The strain gauge portion is also engaged by a head 140 of a fastener 142. The fastener 142 engages a sleeve 144. The sleeve 144 retains a lower riser 150 to the fastener 142. The lower riser has apertures 152 to allow clearance for the fasteners 128.

The bottom plate 118 is integrally formed with a front force transmittal member 154 and a rear force transmittal member 156. A headed fastener 158 and a capture member 160 are provided in a manner similar to that for arrangement 7 in FIGS. 1–2.

In normal operation the floor rail 110 is cantilevered on the load cell strain gauge portion 134 above the vehicle floor 57 (not shown). In a predefined frontal crash situation it is anticipated that the strain gauge portion 134 will rupture or suffer highly significant plastic deformation in a region adjacent to the strain notch 136. However the force transmittal members 154, 156 will again be restrained by the capture members 160.

Referring to FIG. 4 with like items being given identical reference numerals to those provided in FIGS. 1–2, the headed fastener 64 additionally captures under its head 66 a washer 162. The utilization of the washer 162 has been found to increase the strength of retention of the fastener 64 to the vehicle floor 57. Accordingly the capture member 70 is more securely connected to the vehicle floor 57.

While preferred embodiments of the present invention has been disclosed, it is to be understood that they have been disclosed by way of example only and that various modifications can be made without departing from the spirit and scope of the invention as it is encompassed by the following claims.

I claim:

1. An arrangement for mounting a restraint belt mounted vehicle seat to a floor of an automotive vehicle comprising:
   a floor rail supporting said vehicle seat;
   a load cell providing a supporting platform for said floor rail above the vehicle floor;
   a force transmittal member connected to said floor rail;
   a headed fastener connected to the vehicle floor; and
   a capture member connected to the vehicle floor by said fastener, said capture member in normal operational conditions having a clearance with said force transmittal member and wherein in a predefined vehicle crash situation said force transmittal member is moved to an interference with said capture member retaining said floor rail to the vehicle floor.

2. An arrangement as described in claim 1, wherein said floor rail mounts a fore and aft adjustable seat rail.

3. An arrangement as described in claim 1, wherein said capture member has a U-shaped cross-sectional shape with an extending flange.

4. An arrangement as described in claim 3, wherein said capture member has an aperture for allowing insertion of said fastener and wherein said force transmittal member has an aperture positioned adjacent said capture member underneath said extending flange of said capture member.

5. An arrangement as described in claim 1, wherein said fastener connects a lower riser to the vehicle floor and said lower riser supports said load cell.

6. An arrangement as described in claim 5, wherein said lower riser cantileverally supports said floor rail.

7. An arrangement as described in claim 1, having two fasteners, two force transmittal members and two capture members for retaining said floor rail adjacent the front and rear ends of said floor rail.

8. An arrangement for mounting a belt mounted vehicle seat to a floor of an automotive vehicle comprising:
   a floor rail for supporting a fore and aft adjustable seat rail on top thereof with a vehicle seat being fixably connected to said seat rail;
   a lower riser fixably connected to the vehicle floor;
   a load cell fixably connected to said lower riser and said floor rail and supporting said floor rail above said lower riser;
   a force transmittal member connected to said floor rail having an aperture;
   a headed fastener inserted through said aperture of said force transmittal member and connecting said lower riser to the vehicle floor;
   a capture member having a U-shaped cross-sectional shape with extending flanges and an aperture allowing insertion of said fastener to connect said capture member with the vehicle floor, and wherein said force transmittal member aperture is positioned adjacent said extending flanges of said capture member, and wherein said capture member in normal operational conditions having a clearance with said force transmittal member, and wherein in a predefined vehicle crash situation said force transmittal member is moved to an interference with said capture member, retaining said floor rail to the vehicle floor.

9. A method of mounting a belt mounted vehicle seat to a floor of an automotive vehicle comprising:
   supporting a vehicle seat on a floor rail;
   providing a load cell as a supporting platform for said floor rail above the vehicle floor;

connecting a force transmittal member to said floor rail;
connecting a headed fastener to the vehicle floor; and
connecting to the vehicle floor with said fastener a capture member having a clearance with the force transmittal member and in a predefined crash situation wherein said force transmittal member is moved to an interference with said capture member retaining said floor rail to said vehicle seat.

* * * * *